United States Patent [19]

Moore

[11] Patent Number: 4,818,086

[45] Date of Patent: Apr. 4, 1989

[54] FOCUS LOCK FOR BINOCULARS

[75] Inventor: Sidney D. Moore, Claremont, Calif.

[73] Assignee: Bausch & Lomb Incorporated, Rochester, N.Y.

[21] Appl. No.: 165,810

[22] Filed: Mar. 9, 1988

[51] Int. Cl.[4] .............................................. G02B 7/06
[52] U.S. Cl. .................................... 350/552; 350/563
[58] Field of Search ........................ 350/552, 545–551, 350/553–557, 563, 564

[56] References Cited

U.S. PATENT DOCUMENTS

| | | | |
|---|---|---|---|
| 3,540,792 | 11/1970 | Akin | 350/552 |
| 4,066,329 | 1/1978 | Van Exel | 350/552 |
| 4,262,990 | 4/1981 | Kamakura | 350/552 |
| 4,470,671 | 9/1984 | Ishida | 350/552 |
| 4,531,817 | 7/1985 | Sato | 350/552 |
| 4,545,656 | 10/1985 | Takano | 350/552 |
| 4,583,828 | 4/1986 | Kimura | 350/552 |
| 4,616,907 | 10/1987 | Nakamura | 350/552 |
| 4,659,194 | 4/1987 | Swartz | 350/552 |
| 4,674,847 | 6/1987 | Iwaoka | 350/552 |

FOREIGN PATENT DOCUMENTS

| | | | |
|---|---|---|---|
| 2531053 | 1/1977 | Fed. Rep. of Germany | 350/552 |
| 388939 | 4/1908 | France | 350/552 |
| 1323452 | 2/1963 | France | 350/552 |

Primary Examiner—Jon W. Henry
Attorney, Agent, or Firm—DeWitt M. Morgan; John S. Norton

[57] ABSTRACT

A binocular with a focusing/locking knob having a pair of essentially flat paddle platforms which are easily contacted by the fingertips of a user. The paddle platforms being independently pivoted on the knob and having means for preventing rotational motion for locking the knob. The means for preventing rotation being engaged by pivoting the paddle platforms in one direction and disengaged by pivoting the paddle platforms in the opposite direction.

24 Claims, 7 Drawing Sheets

FOCUS LOCK FOR BINOCULARS

FIELD OF THE INVENTION

The present invention relates to a focus adjustment for binoculars or telescopes and more particularly, it relates to a locking mechanism for the focus adjustment.

BACKGROUND OF THE INVENTION

Conventional binoculars are focused on objects at different distances by rotating a round-knob or a focus wheel which adjusts the position of one or more ocular lenses until the magnified image appears sharp. Recently, focus adjusting devices such as the one shown in U.S. Pat. No. 4,066,329 to Van Exel, which is hereby incorporated by reference, have been developed utilizing a lever-like adjusting knob. More particularly, the Van Exel adjusting knob is a treadle-like "rocker" knob having platform surfaces which fall naturally under the user's fingertips to enable the user to quickly adjust the lenses of the binocular.

The Van Exel patent, along with U.S. Pat. No. 3,540,792 to Akin, solved a subtle problem with conventional round-knob focus adjustments which occurs from the inherent tendency of the human eye to accommodate itself to an out-of-focus image. Precise focus is difficult to achieve in a single adjustment, due to the inherent tendency of the eye to "force" a slightly unfocused image into focus. This action arises from an unconscious distortion of the eye's crystalline lens to achieve sharpness of the retinal image. The eye's crystalline lens will "lead" a slow focus adjustment and an accurate adjustment is not accomplished until the binocular has been removed from and returned to the eye several times.

Both the Van Exel and Akin patents provide solutions to this problem by providing a focus adjustment capable of rapid actuation such that true focus is achieved before the accommodation tendency can manifest itself. Due to the ability to rapidly focus objects into view, this type of adjusting knob has become very popular among bird enthusiasts and for military surveillance purposes. A problem experienced, however, is that the focusing knob may be inadvertently displaced by contacting the body or clothing, or simply by nervous twiddling of the lever. Frequently, the object in view is lost in the split second it takes for readjustment.

The solution to this problem is to provide an automatically self-locking capability to the focus adjustment mechanism such that the user's ability to rapidly readjust the focus adjustment is not affected.

SUMMARY OF THE INVENTION

Briefly, this invention relates to a binocular having means for directing linear motion of optical components in the binocular. The binocular also includes means for locking the optical components into a set position of adjustment. More particularly the binocular includes a first and a second telescope. Each of the telescopes includes optical elements which are linearly moveable for affecting the optical focus adjustment of the binocular. The binocular also includes connecting means which are secured to both telescopes. The connecting means includes a fixed hinge tube having a longitudinal axis and an axial opening.

Also included in the binocular is a hub coaxially surrounding the fixed hinge tube. The hub has a diagonal cam opening coincident with the axial opening. The hub also has means for pivotally mounting first and second paddle platforms which pivot on an axle which is parallel to the fixed hinge tube axis. The first and second paddle platforms have means for preventing rotation of the hub. When the first and second paddle platforms are pivoted in one direction, the means for preventing rotation of the hub are engaged, thereby preventing the hub from rotating. When the paddle platforms are pivoted in the opposite direction, the means for preventing rotation are disengaged, thereby allowing the hub to rotate.

The binocular also includes a bridge pin within the fixed hinge tube, coaxial therewith. A fixed cam pin perpendicularly extends through the axial opening of the hinge tube and the diagonal cam opening of the hub. When the hub is rotated the cam pin and the bridge pin are moved axially, which in turn axially moves the optical elements of the binocular.

The means for preventing rotation typically comprises a face of serrations on the first and second paddle platforms for contact with a face of serrations on the surface of the hinge tube 3. When the faces of serrations of the paddle platforms are engaged with the serrations of the hinge tube, the focus adjustment of the binocular is locked. In another embodiment, the first and the second paddles include a blade for contact with the serrations on the surface of the hinge tube. When the blades of the paddle platforms are engaged with the serrations of the hinge tube, the focus adjustment of the binocular is locked.

DESCRIPTION OF THE PREFERRED EMBODIMENTS

Figure 1:
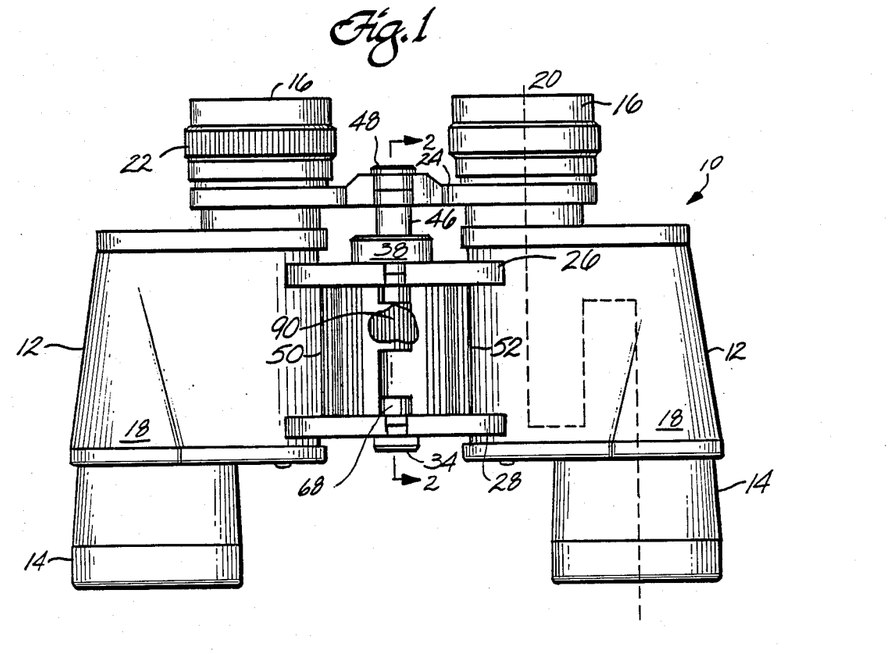
FIG. 1 is a plan view of a binocular according to the invention.

A prism binocular 10, according to the present invention, is shown in FIG. 1, and is of generally conventional construction, except for the focus/lock adjusting knob described in detail below. Binocular 10 includes a pair of monocular prism telescopes 12, each having an objective lens housing 14 and an ocular lens housing 16 mounted at opposite ends of central bodies 18, which contain and support the usual prisms (not shown). The path of light rays passing through the telescopes 12 is shown by dashed line 20, which also defines the optical axis of the objective and ocular lenses (not shown).

One of the ocular lens housings 16 includes an individual eye piece focus ring 22 used to compensate for any dioptric difference between the user's eyes. Both ocular lens housings 16 are conventionally mounted to be axially moveable with respect to central bodies 18 for adjustment of focus, and the ocular lens housings 16 are connected by centrally hinged bridge member 24 so that they simultaneously move together during focusing. Bodies 18 are similarly coupled together by conventional, centrally hinged brackets 26 and 28. Central hinging of these connecting elements enables the monocular telescopes 12 to be moved toward or away from each other to provide interpupillary-spacing adjustment for the binocular.

Figure 2:
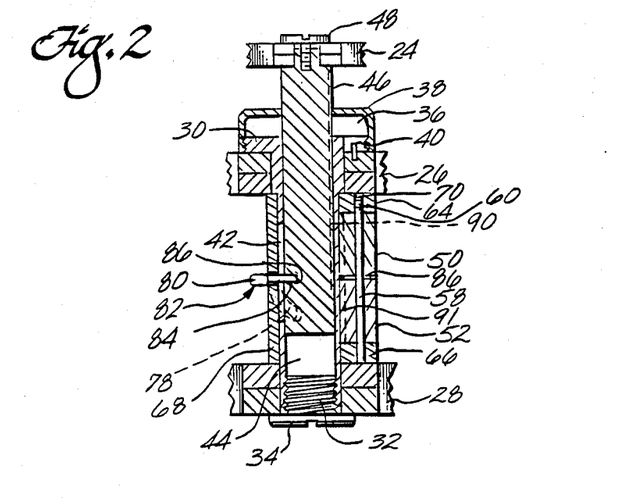
FIG. 2 is a section view on line 2—2 of FIG. 1.

Referring now to FIG. 2, the inner portions of each bracket 26 and 28 are bored to receive a hollow and generally cylindrical hinge tube 30. The forward end of hinge tube 30 is internally threaded to receive a retaining screw 32 having a flange 34 bearing against a front bracket 28. The rear end of hinge tube 30 defines a radially extending flange 36, which sits against the back surface of a rear bracket 26. Extending flange 36 is covered by a flange cap 38 to hide flange 36. Flange 36 includes a radially extending opening which receives an index pin 40 which is rigidly secured to the rear bracket 26. A straight axially extending opening 42 is formed through the central portion of the hinge tube 30. Opening 42 extends into an internal bore 44 of the hinge tube 30.

Ocular lens bridge 24 is slidably coupled to hinge tube 30 by a bridge pin 46 which makes a slip fit in bore 44 of hinge tube 30 (FIG. 2). The rear end of the bridge pin 46 is reduced in diameter to extend into a circular opening of the bridge member 24. Bridge pin 4 and bridge member 24 are secured together by a flangehead retaining screw 48 (FIGS. 1 and 2).

Figure 3:
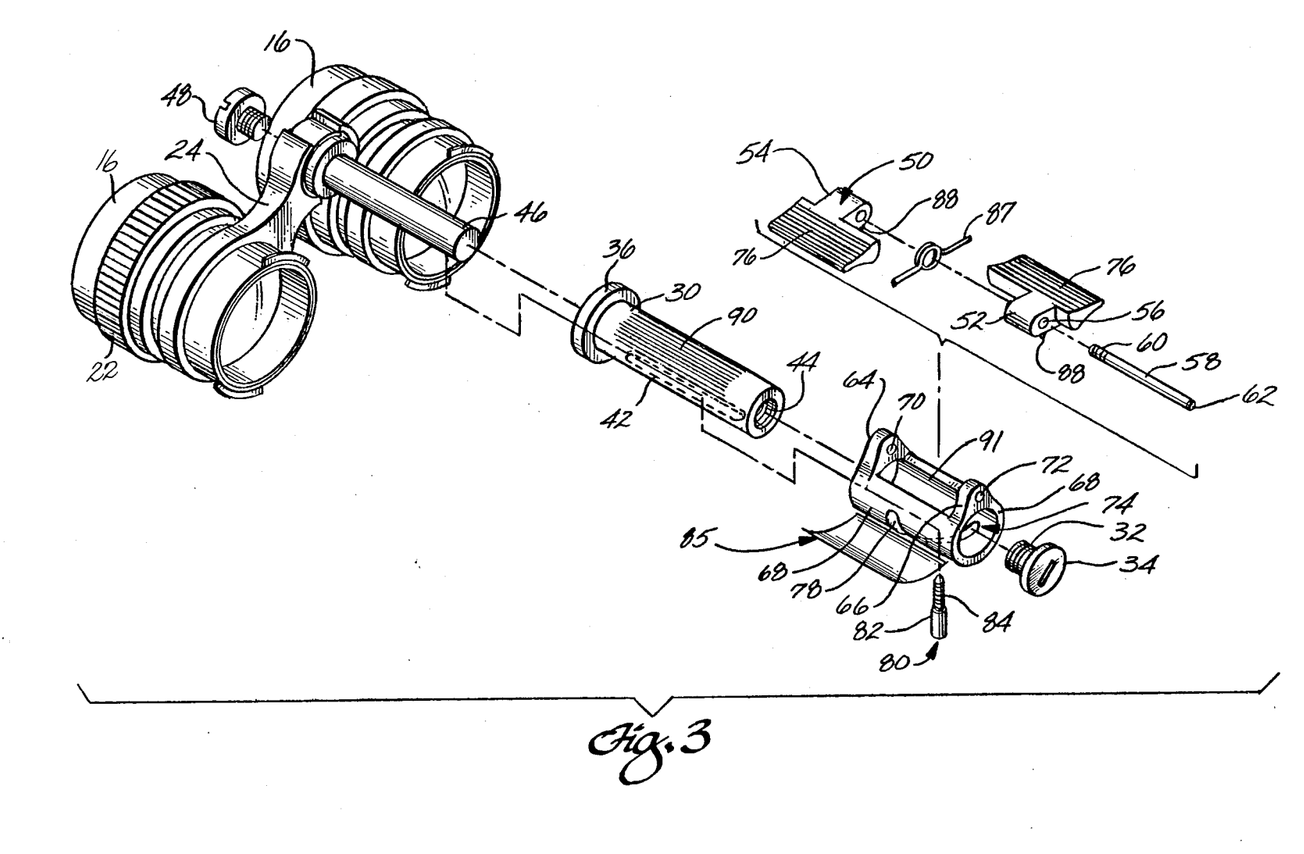
FIG. 3 is an exploded assembly drawing of a preferred embodiment of the invention.

The preferred embodiment for the focus adjusting knob (FIGS. 1, 2, 3, 4 and 5) provides dual paddle platforms 50 and 52, which are formed out of metallic or plastic materials. Referring to FIG. 3, paddle platforms 50 and 52 include center bores 54 and 56 to receive axle pin 58 as shown. Axle pin 58 has one threaded end 60 and a screwdriver opening 62 at the other end. Axle pin 58 and paddle platforms 50 and 52 are supported by bosses 64 and 66 on a central hub 68. Boss 64 has a blind and internally threaded bore 70 to receive the threaded end of axle pin 58. Bore 72 passes through the boss 66 in alignment with bore 70 of boss 64. Axle pin 58 is slid through bore 72 and then through paddle platforms 52 and 50. Axle pin 58 is secured in boss 64 by turning the axle pin in the direction of the screw threading in hole 70. A central cylindrical bore 74 extends through the hub 68 to receive hinge tube 30 as shown in FIG. 3.

The upper surfaces of paddle platforms 50 and 52 laterally extend in opposite directions from axle pin 58 to define a pair of spaced apart platforms which are joined by the axle pin. The upper surfaces of the paddle platforms 50 and 52 define a plurality of axially extending ribs 76 for better contact with the user's fingers. The upper surface of platforms 50 and 52 are generally flattened, but they are preferably concavely curved when viewed in an axial direction (FIG. 3) to conform with the contours of the operating fingertips.

At the bottom portion of hub 68 is a cam opening 78 which slopes at an angle with respect to the rotational axis of the hub. A cam pin 80 extends outwardly through opening 42 in hinge tube 30, and is axially moveable in the opening. Cam pin 80 (FIGS. 2 and 3) has a cylindrical upper surface 82, and a threaded lower end 84 which is received into a mating threaded hole 86 (FIG. 2) in the forward end of bridge pin 46. The cam pin body also extends outwardly into cam opening 78 of hub 68. The upper end of cam pin 82 is opened to receive a screw driver. Cam pin 80 can be threaded into and secured in bridge pin 46. A decorative rectangular cover plate 85 is attached to the outside surface of hub 68 to cover cam pin 80 and cam opening 78.

Figure 4:
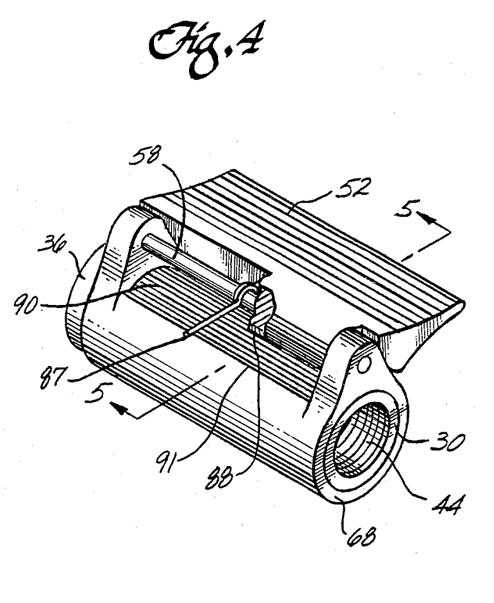
FIG. 4 is a perspective view of an adjustment knob having locking capabilities with one paddle platform removed and a cut-a-way for revealing the blade.
Figure 5:
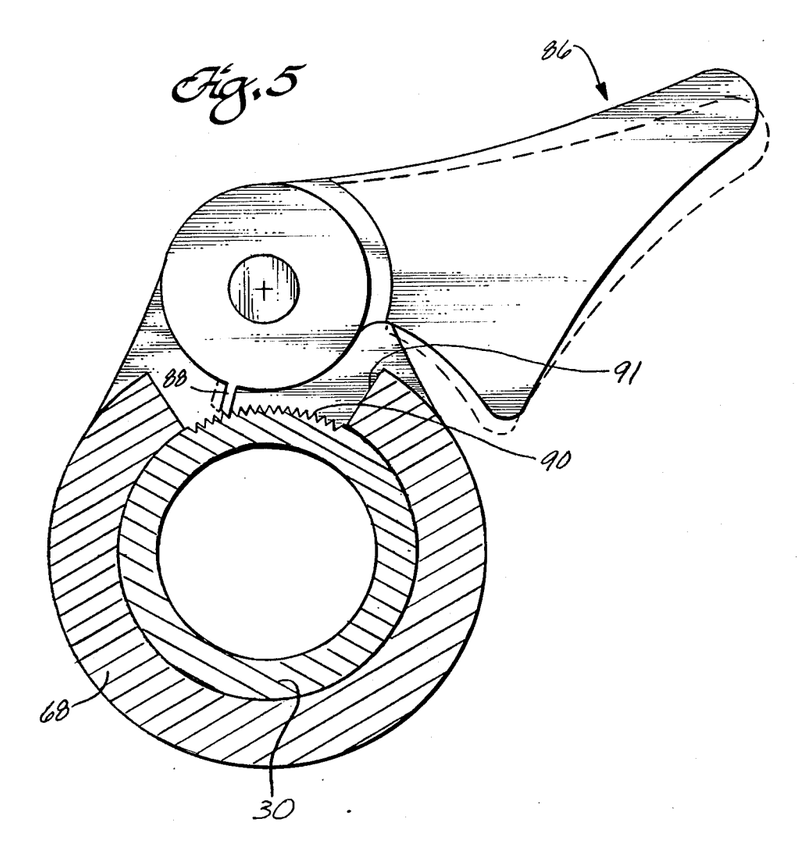
FIG. 5 is a section on line 5—5 of FIG. 4.

Paddle platforms 50 and 52 are forced upwardly in the position shown in FIG. 4, by a wire spring 87. The opposed ends of Spring 87 sit in retaining openings (not shown) in the undersurfaces of paddle platforms 50 and 52. Spring 87 may also be of a leaf spring type. Spring 87 maintains paddle platforms 50 and 52 flexed upwardly such that a blade 88 makes contact with a face of serrations 90 on hinge tube 30 (FIG. 4). This formation effectively creates a clutching mechanism for locking the focus of the binocular into place (FIGS. 4 and 5). When paddle platforms 50 and 52 are forced downwardly as shown in FIG. 5, blade 88 loses contact with serrations 90 of hinge tube 30 and hub 68 is free to rotate about hinge tube 30. Referring to FIG. 5, hub 68 may then be rotated to effect movement of cam pin 80 in cam opening 78, which in turn moves ocular lens bridge 24 axially to change the focus adjustment of the binocular.

In operation, binocular 10 is gripped by the user in normal fashion with the fingers of the right and left hands extending toward each other over the top of telescope bodies 18. When focusing is necessary, the fingertips are rested on paddle platforms 50 and 52, and the paddle platforms are pressed downwardly (FIG. 5), releasing the blades 88 from the serrations 9 of hinge tube 30 such that hub 68 can rotate. Rotation of hub 68 is effected by applying slightly more force upon the paddle platform 50 or 52 in the desired direction. The finger(s) which rest on the other paddle platform impart enough resistance to maintain blade edge 88 from contacting the serrations 90 of hinge tube 30. This permits a smooth, but rapid, adjustment of focus. If the user overshoots a position of focus, rotation of hub 68 is simply reversed by applying slightly more downward force on the other platform in the opposite direction. The selected focus adjustment is automatically locked into place upon release by the user of paddle platforms 50 and 52; blade edge 88 engages serrations 90 of the hinge tube 30.

The movement of hub 68 is rotational, but the action sensed by the user's fingers is dominantly linear and vertical (as suggested by arrows to 86 in FIG. 5) when the binocular is held in a normal horizontal viewing position. The action is natural and comfortable and the user is able to achieve fast and accurate focusing without difficulty, while maintaining a steady, two-handed grip on the binocular body. Locking the focus adjustment is automatic and instantaneous when paddle platforms 50 and 52 are released by the user.

When hub 68 is rotated by the dominantly vertical motion of the user's fingers, cam pin 80 is driven along cam opening 78, and bridge pin 46 is moved axially within hinge tube 30. Hinge tube 30 is fixed by pin 40 (FIG. 2) and never moves. Movement of bridge pin 46 is transmitted to bridge member 24, which in turn, imparts axial movement to coupled ocular lens housings 16. Rapid short-stroke focusing is achieved by the steepness of cam opening 78 with respect to the rotational axis of hub 68. Rotation of hub 68 in an arc of about 40 degrees is sufficient to displace ocular lens housings 16 axially to provide a full focusing range.

A significant advantage of this construction is that assembly is quick and simple, and disassembly for repair purposes is rapidly accomplished. Paddle platforms 50 and 52 are assembled onto hub 68 by sliding axle pin 58 through the boreholes of paddle platforms 50 and 52, respectively (FIG. 3). Axle pin 58 is then screwdriver driven into threaded borehole 70 of hub 68. The remainder of the binocular is assembled by inserting hinge tube 30 through brackets 26 and 28 and bore 74 of hub 68 to hinge monocular telescopes 12 together. Hinge tube 30 is secured into place with retaining screw 32. Bridge pin 46 is then connected to ocular bridge member 24 by retaining screw 48 as shown in FIG. 3, and bridge pin 46 is then slipped into bore 44 of hinge tube 68. More particularly, bridge pin 46 is slipped into bore 44 of the hinge tube 30 to position the threaded hole 86 beneath opening 42 of hinge tube 30 and cam opening 78. Cam pin 80 is then installed through openings 78 and 42 to be threaded securely into hole 86. Ready access to cam pin 80, which is provided by extending cam opening 78 to the outer surface of hub 68, enables the binocular to be easily assembled or disassembled without special jigs or fixtures.

The invention also contemplates an alternative locking/focus adjusting mechanism as shown in FIGS. 6–11. The alternative embodiment causes the associated binocular to focus in substantially the same way as the first embodiment; however, the locking mechanisms in the two embodiments differ. More particularly, hub 68, hinge tube 30, and paddle platforms 50 and 52 are designed with a different locking mechanism as shown in FIGS. 6–11.

Figure 6:
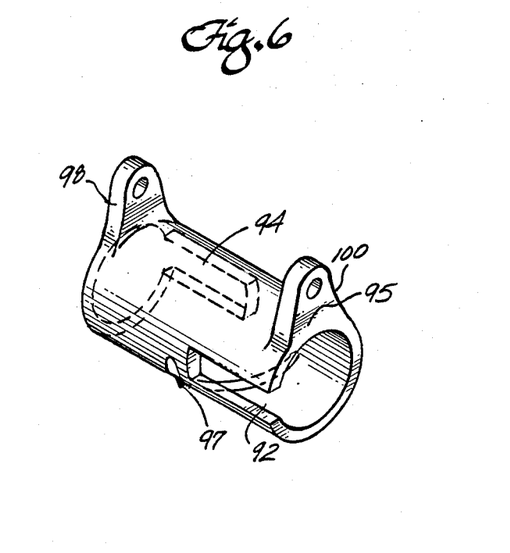
FIG. 6 is a perspective view of an alternate hub.

Referring to FIG. 6, an alternate embodiment of hub 68 is shown as hub 95. Hub 95 has a cam opening 97 at its lower side which is identical to the cam opening 78 of hub 68 of FIG. 3. However, instead of having an open window 91 at the top of the hub 88 as in FIG. 3, two openings 92 and 94 are provided on either side of hub 95 as shown in FIG. 6.

Figure 7:
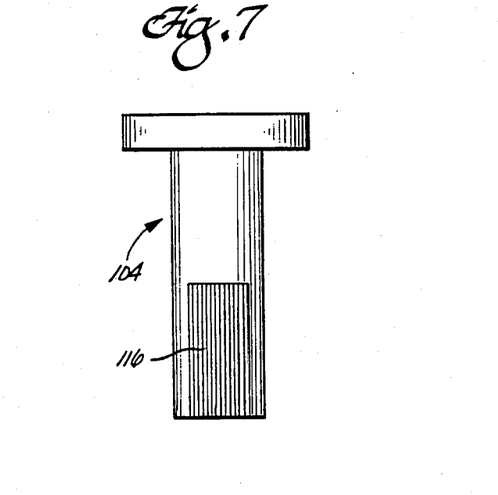
FIG. 7 is a plan view of an alternate hinge tube.
Figure 10:
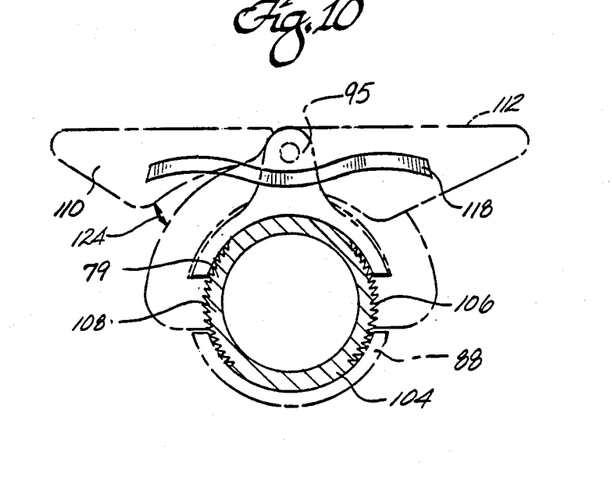
FIG. 10 is a section view along line 10—10 of FIG. 9.
Figure 11:
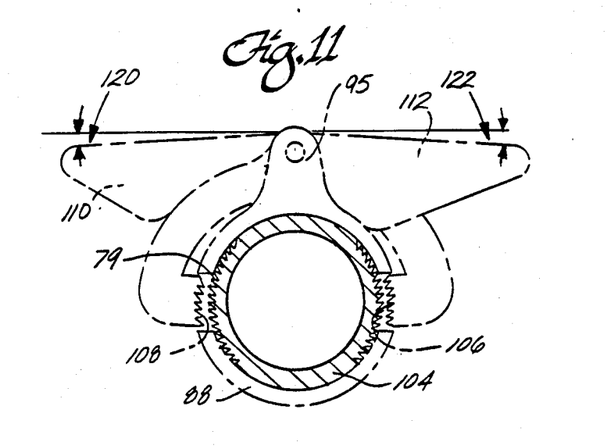
FIG. 11 is a section view similar to FIG. 10 showing paddle platforms in the disengaged position.

Referring to FIG. 7, a hinge tube 104 for the alternate embodiment is shown. Hinge tube 104 is constructed similar to the hinge tube 30 of the first embodiment; however, hinge tube 104 contains serrations in the rotational range of the openings 92 and 94 of hub 95. The serrations 116 provide a friction fit with serrations on the faces 106 and 108 of paddle platforms 110 and 112 (FIGS. 10 and 11). The serrations on the face of the hinge tube 104 (a second set of serrations is on the reverse side of hinge tube 104 (not shown)) are preferably flat, radial steps which mate with the serrations of the faces 106 and 108 of the platform paddles 110 and 112. The steps in the platform paddles may have slightly off radius landings to provide an improved gripping engagement as detailed in FIGS. 10 and 11.

Figure 8:
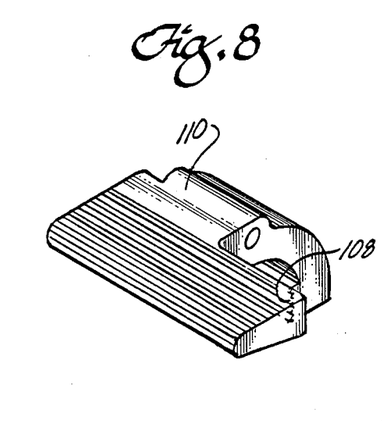
FIG. 8 is a perspective view of an alternate paddle platform.
Figure 9:
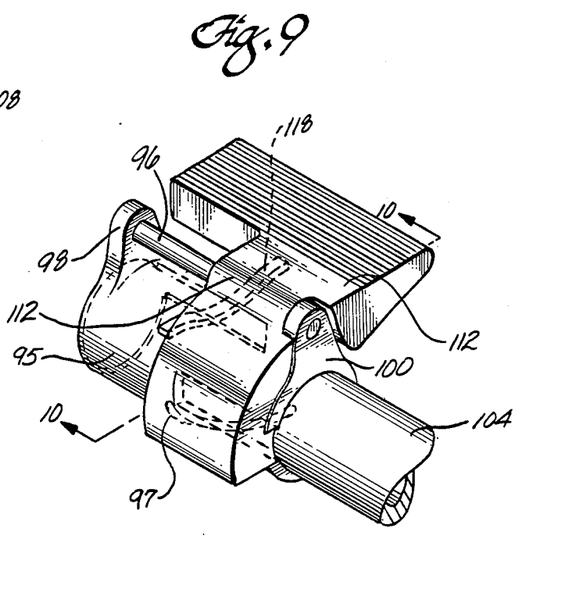
FIG. 9 is a perspective view of an alternate embodiment of the adjustment knob showing one paddle platform removed.

Referring to FIG. 9, an axle pin 96 supported by bosses 98 and 100 provides a hinge for an alternate embodiment of paddle platforms 110 and 112. Partial construction of the alternate embodiment is shown (FIG. 9) with one of the platform paddles missing. The missing paddle platform is shown in FIG. 8. More particularly, hinge tube 104 is shown in combination with hub 95, paddle platform 112, axle pin 96 and leaf spring 118. Leaf spring 118 forces paddle platforms 110 and 112 into contact with the serrations of the hinge tube 104 when no downward force is applied to the paddle platforms (FIG. 10). Paddle platforms 110 and 112 are disengaged from hinge tube 104 when a force is applied in the downward direction by user's fingers as shown by lines 120 and 122 of FIG. 11. In order to disengage the paddle platforms from the hinge tube 104, paddle platforms 120 and 122 must move through at least a limited range 124, which distance is required to release the paddle platform serrations from the hinge tube 88 serrations.

The rotation of the hub 88 is affected by applying slightly more force upon one of the paddle platforms in the desired direction. The user's fingers, which rest on the other platform, impart enough resistance to maintain the faces of serrations 106 and 108 from contacting the serrations of the hinge tube 104. This permits a smooth, but rapid, adjustment of focus. If the user overshoots a position of focus, rotation of hub 88 is simply reversed by applying slightly more downward force on the other platform in the opposite direction. The focus adjustment is automatically locked into place upon release of the paddle platforms.

The invention has been described in an exemplary and preferred embodiment, but it is not limited thereto. Those skilled in the art will recognize that a number of additional modifications and improvements can be made to the invention without departure from the essential spirit and scope. The telescopes used in the binocular are conventional, and the novel central hinge tube, paddle platforms, and locking mechanism can be adapted to a number of different styles of binoculars. The focus-locking knobs described above are useful to control moveable optical elements in monocular instruments such as spotting telescopes and the like. The telescopes and the binoculars described need not contain brackets disposed transversely in relation to the hinge tube. The telescopes may be mounted together in combination with the hinge tube.

Therefore, the invention is not limited by the above disclosure, but only by the following claims.

What is claimed is:

1. In a binocular having a pair of telescopes mounted in axial alignment with a hinge tube, said binocular having a focus knob for the focus adjustment of said binocular, said knob being mounted on said hinge tube, said knob comprising:

a hub mounted between said pair of telescopes for rotation about the longitudinal axis of said hinge tube, said hub including means for supporting an axle pin for pivoting first and second paddle platforms thereon, said pin axially aligned with said hinge tube;

said first and said second paddle platforms extending radially outward relative to said axle pin in substantially opposite directions, said first and second paddle platforms being independently pivoted on said axle pin and each of said first and second paddle platforms having means for preventing rotating motion of said hub, said means being engaged by pivoting said paddle platforms in one direction and disengaged by pivoting said paddle platforms in the opposite direction, whereby movement of said hub is accomplished by pushing said first and said second paddle platforms in their respective disengaging directions and pushing one of said paddle platforms slightly more than the other paddle platform for rotational motion of said hub.

2. The knob of claim 1 wherein said hub further comprises at least one opening for enabling said means for preventing rotation to be engaged or disengaged with said hinge tube.

3. The knob of claim 1 further comprising a biasing means for biasing said first and second paddle platforms in said engaging direction.

4. The knob of claim 3, wherein said biasing means further comprises a spring for biasing said paddle platforms in said engaging direction.

5. The knob of claim 1 wherein said rotation preventing means further includes at least one serration for contact with said hinge tube.

6. The knob of claim 5 wherein said hinge tube further includes a plurality of serrations for mating with said at least one serration of said rotation preventing means.

7. The knob of claim 1 wherein said rotation preventing means further includes a blade for contact with said hinge tube.

8. The knob of claim 7 wherein said hinge tube further includes a plurality of serrations for mating with said blade of said rotation preventing means.

9. In a binocular having a pair of telescopes mounted to a hinge tube, an adjusting apparatus comprising:
an adjusting knob for effecting adjustment of said binocular;
a first and a second paddle platform pivotally mounted on and extending outward from said adjusting knob in substantially opposite directions, each said first and said second paddle platforms having means for preventing rotation of said adjusting knob, said means being engaged to said hinge tube by pivoting said paddles in one direction and disengaged from said hinge tube by pivoting said paddle platforms in the opposite direction, whereby movement of said adjusting knob is accomplished by first pushing said first and second paddle platforms in their respective disengaging directions and then pushing one of said paddle platforms slightly more than the other paddle platform for rotation of said knob.

10. The adjusting apparatus of claim 9 wherein said adjustment knob further comprises at least one opening for enabling said means for preventing rotation to be engaged or disengaged with said hinge tube.

11. The adjusting apparatus of claim 10 further comprising a biasing means for biasing said first and second paddle platforms in said engaging direction.

12. The adjusting apparatus of claim 11 wherein said biasing further comprises a spring for biasing said first and second paddle platforms in said engaging direction.

13. The adjusting apparatus of claim 9 wherein said rotation preventing means further includes at least one serration for contact with said hinge tube.

14. The adjusting apparatus of claim 13 wherein said hinge tube further includes a plurality of serrations for mating with said at least one serration of said rotation preventing means.

15. The adjusting apparatus of claim 9 wherein said means for preventing rotation further includes a blade for contact with said hinge tube.

16. The adjusting apparatus of claim 15 wherein said hinge tube further includes a plurality of serrations for mating with said blade of said means for preventing rotation.

17. A binocular having means for directing linear motion of optical components in binocular and means for locking said optical components into a set position of adjustment, said binocular comprising:
 (a) a first and a second telescope, each of said telescopes including linearly movable optical elements for affecting an optical focus adjustment;
 (b) connecting means secured to said telescopes, said connecting means including a fixed hinge tube, said hinge tube having a longitudinal axis and an axial opening;
 (c) a hub coaxially surrounding said hinge tube, said hub having a diagonal cam opening coincident with said axial opening of said hinge tube, said hub also having an axle pin for pivotally mounting a first and a second paddle platform thereon, said first and second paddle platforms pivoting on said pin in an axis parallel to said hinge tube axis through a limited range only, said first and second paddles having means for preventing rotation of said hub, wherein pivoting said paddles in one-direction engages said means for preventing rotation, thereby preventing said hub from rotating, and wherein pivoting said paddle in the opposite direction disengages said means for preventing rotation, thereby allowing said hub to rotate;
 (d) a bridge pin coaxially within said hinge tube, said bridge pin having a fixed cam pin perpendicularly extending through said axle opening of said hinge tube and said diagonal cam opening of said hub, whereby rotation of said hub biases said cam pin and said bridge pin into motion, thereby moving said optical elements.

18. The hub of claim 17 further comprising at least one opening for enabling said means for preventing rotation to be engaged with said hinge tube.

19. The binocular of claim 17 wherein said means for preventing rotation further includes at least one serration for contact with said hinge tube.

20. The binocular of claim 19 wherein said hinge tube includes a plurality of serrations for mating with said at least one serration of said means for preventing rotation.

21. The binocular of claim 17 further comprising means for biasing said first and second paddle platforms in said engaging direction.

22. The binocular of claim 21 wherein said biasing means further comprises a spring for biasing said first and second paddle platforms in said engaging direction.

23. The binocular of claim 17 wherein said means for preventing rotation further includes a blade for contact with said hinge tube.

24. The binocular of claim 23 wherein said hinge tube further includes a plurality serrations for mating with said blade of said means for preventing rotation.

* * * * *